(12) United States Patent
Vermeir (10) Patent No.: US 9,478,017 B2
(45) Date of Patent: Oct. 25, 2016

(54) GUIDED IMAGE FILTERING FOR IMAGE CONTENT

(71) Applicant: Barco N.V., Kortrijk (BE)

(72) Inventor: Thijs Koen Vermeir, Staden (BE)

(73) Assignee: Barco N.V., Kortrijk (BE)

( * ) Notice: Subject to any disclaimer, the term of this patent is extended or adjusted under 35 U.S.C. 154(b) by 131 days.

(21) Appl. No.: 14/328,920

(22) Filed: Jul. 11, 2014

(65) Prior Publication Data

US 2015/0016720 A1 Jan. 15, 2015

(30) Foreign Application Priority Data

Jul. 12, 2013 (GB) .................................. 1312533.1

(51) Int. Cl.
| | |
|---|---|
| G06K 9/00 | (2006.01) |
| G06T 5/20 | (2006.01) |
| G06T 9/00 | (2006.01) |
| G06T 7/40 | (2006.01) |
| G06T 3/40 | (2006.01) |
| H04N 1/46 | (2006.01) |

(52) U.S. Cl.
CPC ............... *G06T 5/20* (2013.01); *G06T 3/4007* (2013.01); *G06T 7/408* (2013.01); *G06T 9/00* (2013.01); *H04N 1/46* (2013.01)

(58) Field of Classification Search
None
See application file for complete search history.

(56) References Cited

U.S. PATENT DOCUMENTS

2006/0050783 A1* 3/2006 Le Dinh ................ H04N 5/208
375/240.2

2010/0142843 A1 6/2010 Chen
2013/0329004 A1* 12/2013 Baqai .................... H04N 5/217
348/36

OTHER PUBLICATIONS

He et al.; "Guided Image Filtering"; Jun. 2013; IEEE Transactions on Pattern Analysis and Machine Intelliigence; vol. 35; pp. 1397-1409.*
He et al, *Guided Image Filtering*, IEE transactions on pattern analysis and machine intelligence, 2013, vol. 35, issue 6, pp. 1397-1409, (Jun. 2013).
Chen et al, *Face Illumination Transfer Through Edge-Preserving Filters*, IEEE conf. computer vision and pattern recognition, 2011, pp. 281-287, (Jun. 2011).
Search Report dated Jan. 13, 2014 for Corresponding GB application No. GB1312533.1.

* cited by examiner

*Primary Examiner* — Eueng-Nan Yeh
(74) *Attorney, Agent, or Firm* — Renner, Otto, Boisselle and Sklar LLP (57) ABSTRACT

Apparatus 10 for processing image data comprises an input 11 arranged to receive image data representing an image. The image data comprises a luminance component 13 at a first spatial resolution and at least one chrominance component 14 at a second, lower, spatial resolution. An up-sampling unit 18 up-samples the spatial resolution of the at least one chrominance component 14 to form an up-sampled chrominance component. A guided image filter (GIF) 20 filters the up-sampled chrominance component. The guided image filter comprises a radius parameter which determines an extent of the filter around a pixel. A control unit 15 for the guided image filter 20 determines a value of the radius parameter of the guided image filter. The value of the radius parameter is variable for different pixels of the image, or for different regions of pixels of the image. The control unit 15 can analyze the image data to determine the value of the radius parameter.

21 Claims, 8 Drawing Sheets

GUIDED IMAGE FILTERING FOR IMAGE CONTENT

TECHNICAL FIELD

This invention generally relates to processing image data and to apparatus for processing image data.

BACKGROUND

Visual content, such as images or video, can be provided in a range of different colour spaces. Examples of colour spaces are YUV 420, YUV 444 and RGB 444. In a YUV colour space there is a luminance (Y) component and two chrominance components (U, V). Colour spaces can differ in the amount of data that is used to encode the colour (chrominance) components of the signal.

The Human visual system (HVS) is more sensitive to variations in brightness than colour. Some colour space coding schemes use this property to reduce the amount of data used to encode colour components of the image. For example, in a YUV 420 colour space the colour (chrominance) components have half the spatial resolution of the brightness (luminance) component.

Colour spaces which use a reduced amount of data to encode the colour components, such as YUV 420, are often used in consumer electronics and industrial applications. Colour space conversion can be performed where it is desired to convert content from one colour space to another colour space. For example, content can be up-sampled (upscaled) from a lower quality colour space (e.g. YUV 420) to a higher quality colour space (e.g. YUV 444).

Visual artifacts can occur when up-sampling content from a lower quality colour space to a higher quality colour space. This reduces the quality of the content that is presented to a user.

SUMMARY

An aspect of the invention provides a method comprising:

receiving image data representing an image, the image data comprising a luminance component at a first spatial resolution and at least one chrominance component at a second, lower, spatial resolution;

up-sampling the spatial resolution of the at least one chrominance component to form an up-sampled chrominance component;

determining a value of a radius parameter for a guided image filter for filtering the image, wherein the value of the radius parameter is variable for different pixels of the image, or for different regions of pixels of the image, the radius parameter determining an extent of the guided image filter around each pixel; and filtering the up-sampled chrominance component using the guided image filter.

Advantageously, the guided image filter can use the luminance component as a guide for the filtering of the up-sampled chrominance component.

Advantageously, the method further comprises analysing at least one component of the image data to determine the value of the radius parameter for each pixel of the image, or for each region of pixels of the image.

Advantageously, the analysing comprises analysing the luminance component of the image data.

Advantageously, the method further comprises determining a value of a further parameter for the guided image filter for filtering the image, wherein the value of the further parameter is variable for different pixels of the image, or for different regions of pixels of the image.

The method can be performed as part of an image decoder.

The method can be performed as part of an image encoder, wherein the step of determining a value of a radius parameter for a guided image filter is used to determine data for sending to an image decoder.

Another aspect of the invention provides a system for processing image data comprising:

an input arranged to receive image data representing an image, the image data comprising a luminance component at a first spatial resolution and at least one chrominance component at a second, lower, spatial resolution;

an up-sampling unit arranged to up-sample the spatial resolution of the at least one chrominance component to form an up-sampled chrominance component;

a guided image filter arranged to filter the up-sampled chrominance component, wherein the guided image filter comprises a radius parameter which determines an extent of the filter around a pixel; and a control unit for the guided image filter arranged to determine a value of the radius parameter of the guided image filter, wherein the value of the radius parameter is variable for different pixels of the image, or for different regions of pixels of the image.

Advantageously, the apparatus further comprises an analysing unit arranged to analyse at least one component of the image data to determine the value of the radius parameter for each pixel of the image, or for each region of pixels of the image.

Advantageously, the apparatus can be further arranged to perform any of the described or claimed method steps.

The method or apparatus can be used as part of a conversion between colour spaces, such as a low quality colour space (e.g. YUV 420) to a higher quality colour space (e.g. YUV 444).

An advantage of the method can be reduced artifacts in the up-sampled image.

The method can be used as part of a decoder or a transcoder in the field of professional electronics or consumer electronics (CE).

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory medium. The machine-readable instructions can be downloaded to the storage medium via a network connection.

BRIEF DESCRIPTION OF THE DRAWINGS

Embodiments of the invention will be described, by way of example only, with reference to the accompanying drawings in which.

DETAILED DESCRIPTION

Figure 1:
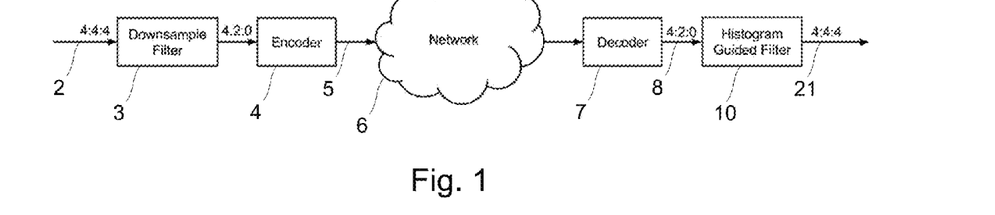
FIG. 1 shows an overall system for processing visual content.

FIG. 1 shows an example of a system for processing visual content. The input 2 of the system is a video stream in a high quality colour space, such as YUV 444. This video stream 2 could be supplied by any suitable source, such as a camera or computer. This stream is down-sampled by a down-sampling filter 3 to a lower quality colour space such as YUV 420. The down-sampled signal can be compressed by a standard codec 4 (e.g. H.264/AVC, H.265/HEVC) in a main profile. The compressed stream 5 can then be transported over a network 6 or recorded on a data carrier. Any device that supports the main profile decoding will be able to decode 7 this stream to the YUV 420 colour space and output a YUV 420 signal 8. Subsequently, the signal 8 in the lower quality colour space can be applied to a system 10 to convert the signal 8 to a higher quality colour space, such as YUV 444, and output 21 the higher quality signal.

Figure 2:
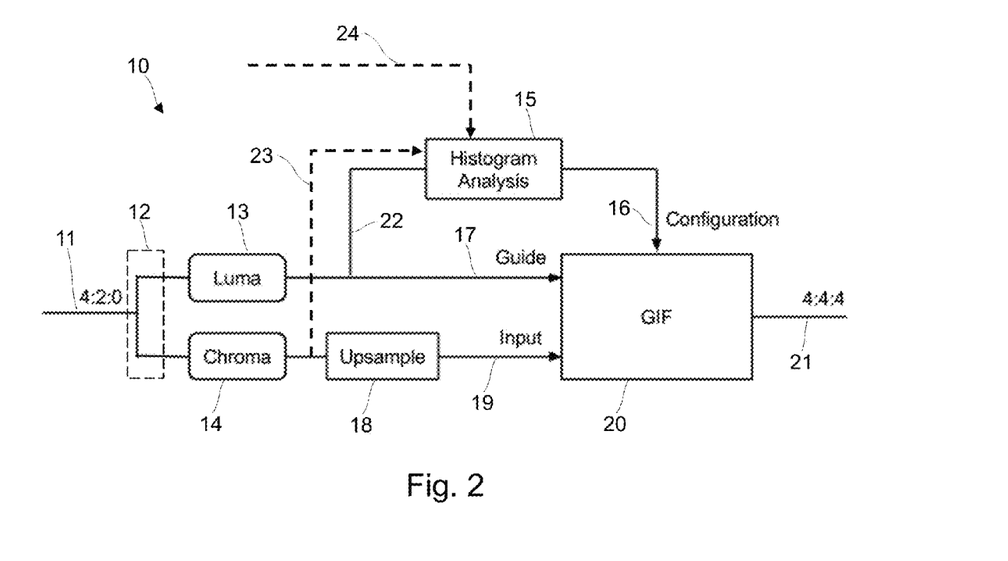
FIG. 2 shows apparatus for processing visual content using a guided image filter.

FIG. 2 schematically shows an example of apparatus 10 for processing visual content according to an embodiment. One use of the apparatus 10 is to perform the colour space conversion shown in the final stage of FIG. 1. An input 11 is provided for receiving visual content (e.g. video content). The input can receive the signal 8 shown in FIG. 1. A processing element 12, such as a demultiplexer, separates the content into a luminance component 13 and one or more chrominance components 14. Typically, there will be two chrominance components, such as the U (Cb) and V (Cr) components of a YUV colour space signal. The luminance component 13 can have a higher spatial resolution than the chrominance component 14. For example, the luminance component 13 can have a spatial resolution which is twice that of the chrominance component 14. An up-sampling function 18 up-samples the chrominance data to a higher resolution. Typically, the up-sampling of the chrominance data will be to the same spatial resolution as the luminance data. The luminance data is applied to a guide input 17 of a guided image filter (GIF) 20. The chrominance data is applied to an input 19 of the guided image filter 20. A control unit 15 determines at least one configuration parameter of the guided image filter 20. In an embodiment, the control unit 15 can perform an analysis of at least one component of the image data, such as the luminance data 13, and output configuration data to an input 16 of the guided image filter 20. The control unit 15 can perform an analysis of a histogram of luminance data received via input 22. An alternative is for the control unit 15 to use chrominance data 14, received via path 23, instead of (or in addition to) the luminance data 13. Another alternative is for the control unit 15 to use data received via path 24, from an encoder, instead of (or in addition to) the luminance data 13 and/or chrominance data 14.

The guided image filter 20 computes the filtering output by considering the content of a guidance image. This filter can be used as an edge-preserving smoothing operator like the bilateral filter, but it has better behaviours near edges. It can transfer the structure of the guidance image to the filtering output. The filter has a linear time algorithm, regardless of the kernel size and the intensity range. The guided image filtering function 20 can use a technique described in the paper "Guided Image Filtering", He, Kaiming, Jian Sun, and Xiaoou Tang, IEEE Transactions on Pattern Analysis and Machine Intelligence 35.6 (2013): 1397-1409. The filter has four inputs: the input image p (input 19), the guidance image I (input 17) and configuration parameters radius r and regularization $\epsilon$ (input 16). In this embodiment shown in FIG. 1 the guidance image I is the full resolution luminance component and the input image is the up-sampled chrominance image. The radius r defines the window size of the smoothing filter (i.e. the extent of the filter around a pixel being filtered) and the regularization parameter $\epsilon$ can influence the edge detecting properties of the filter. The filter can be applied to each of the up-scaled chrominance components, e.g. the U and V components. The output of the filter 20 is the same image as received at the input, but with an improved visual quality.

In accordance with an embodiment, the radius parameter r of the guided image filtering function 20 is not fixed but, instead, can vary across an image. The value of the radius parameter can be based on analysis of the luminance data performed by the control unit 15.

The process shown in FIG. 2 can be applied to a single image or to a sequence of images (e.g. video).

Figure 3:
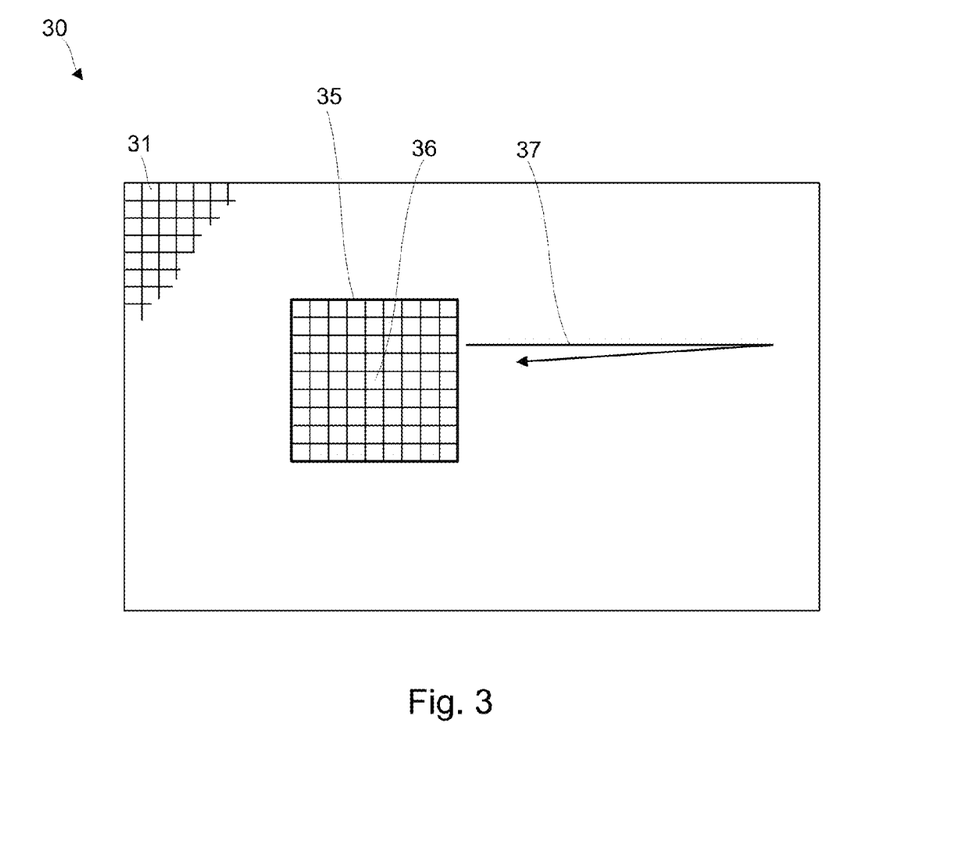
FIG. 3 shows analysis of an image.

FIG. 3 shows an example of the analysis performed by control unit 15. An image 30 comprises a plurality of pixels 31. A region 35 of pixels are analysed at a time. The region can comprise a block 35 (e.g. a 9×9 pixel block) of pixels, as shown in FIG. 2, although the region can have a different shape and/or different size. The region 35 forms a kind of window which is moved across the image data. The window can be positioned at a plurality of different places on the image data. For example, the window 35 can be repositioned 37 until every pixel 31 has been positioned at the centre of the window 35. For pixels at or near edges of the image only a portion of the window may be used. In another example, the window 35 can be positioned on a first block of pixels 31 of the image data and then repositioned on a second block of pixels which is adjacent to the first block of pixels 31. This is repeated until the window has been positioned on every block of pixels in the image. As described above, the analysis can be performed on the luminance data 13 or a chrominance component 14.

Figure 4A:
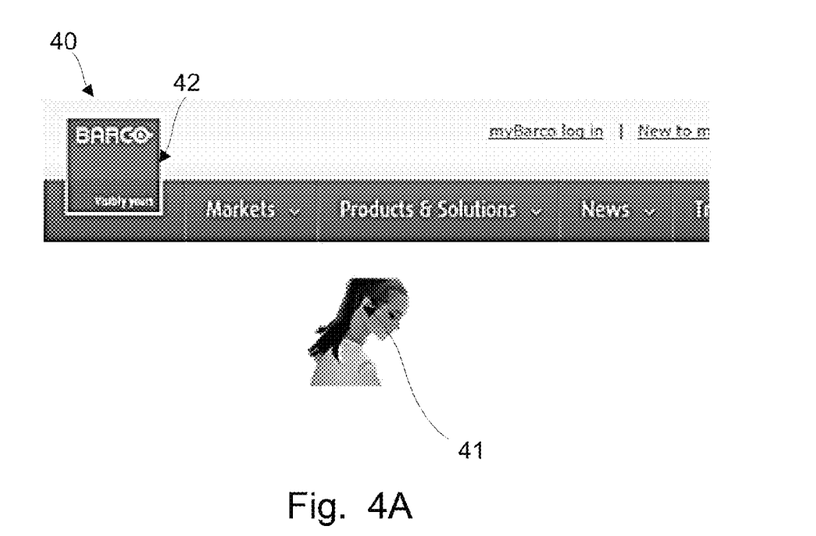
FIG. 4A shows an example image.
Figure 4B:
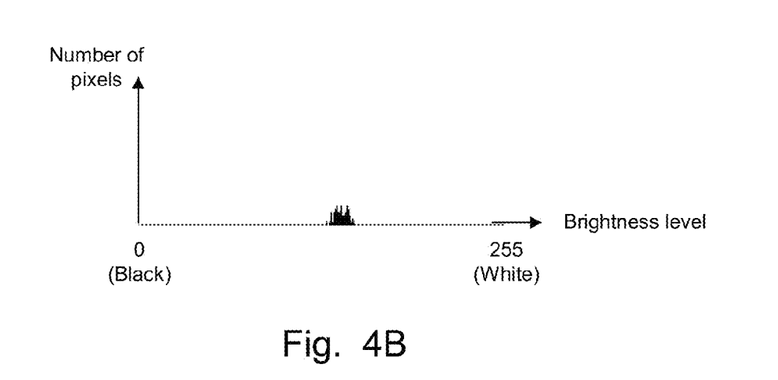
FIGS. 4B and 4C show example histograms obtained from the image of FIG. 3.
Figure 4C:
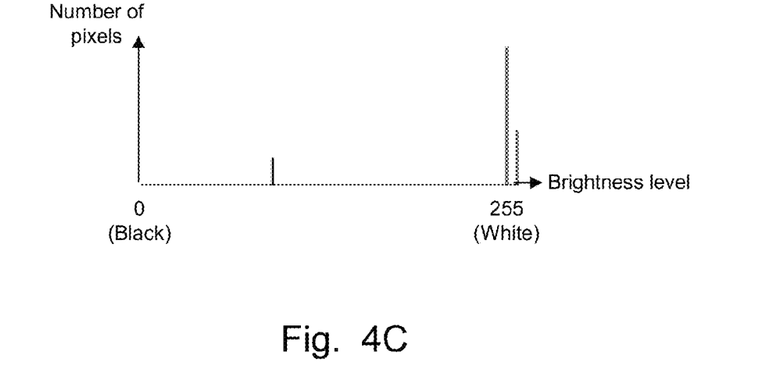

The analysis of the image data performed at each position of the window 35 can be a histogram of luminance data values (i.e. brightness values). FIG. 4A shows part of a sample image 40 representing a website. FIGS. 4B and 4C show two histograms of luminance data, each taken at a different position within the image 40. FIG. 4B shows a histogram taken at a position 41 near the ear of the woman in the image and FIG. 4C shows a histogram taken at a position 42 around the logo. The x-axis of the histogram represents the possible range of brightness values (e.g. 0-255) and the y-axis represents a number of pixels in the window having the same brightness value. Different brightness values in the luminance data are representative of different colours in the image data. If analysis is performed on chrominance data, then the x-axis of the histogram represents different colours.

Positions 41 and 42 have been purposely chosen to illustrate two different types of image content. Position 41 represents natural content, such as a photographic image, with a wide range of brightness levels/colours. Position 42 represents screen content, which can be computer-generated content. In this example it is a logo with an area of solid colour and sharp edges. The local histograms are different for the two types of content, and the histograms are indicative of type of content and can be used to distinguish between types of content. One criteria which can be applied to the histograms is the number of brightness levels appearing in the histogram. FIG. 4B shows a range of different brightness levels/colours resulting from the natural (photographic) image content. FIG. 4C shows a much smaller number of distinct brightness levels/colours resulting from the logo. It is advantageous that each type of content is filtered by the GIF function 20 in a different manner. By analysing a criterion of the image data which is indicative of content of the image data, it is possible to select a value of a parameter of the GIF function 20 appropriate to the image content.

The example described above uses number of brightness levels/colours in the histogram as a criterion which is indicative of content of the image data. It is possible to use the number of pixels having a particular brightness level/colour (i.e. the y-axis in FIGS. 4B and 4C) as a criterion which is indicative of content of the image data. For example, if one brightness level/colour has a high number of pixels, then there is a high probability that this pixel forms part of a region of screen content. Another example is that if any brightness level/colour has a number pixels smaller than a particular threshold value (e.g. 3) then there is a high probability that this pixel forms part of a region of natural content. Analysis criteria can be combined so that, for example, a combination of number of brightness levels/colours in the histogram can be combined with use the number of pixels having a particular brightness level/colour.

In one embodiment, a look-up table of values is provided. Each entry in the table is a correspondence between a number of brightness levels/colours in an analysed region 35 of the image and a value of a parameter (e.g. radius) for the guided image filtering. An example table for the parameter "radius" is given below.

TABLE 1

| Number of Colours in Histogram | Radius for GIF |
|---|---|
| 1 | 9 |
| 2 | 7 |
| 3 | 3 |
| 4 | 3 |
| 5 | 3 |
| 6 | 3 |
| 7 | 3 |
| 8 | 1 |
| 9 | 1 |
| ... | ... |
| Max | 1 |

In this example table it can be seen that the value of radius for the guided image filtering (GIF) is inversely proportional to the number of brightness levels/colours. For example, if two brightness levels/colours are found in the histogram around a given pixel, then a radius=7 is used in the GIF for this pixel. If nine, or more than nine, brightness levels/ colours are found in the histogram around a given pixel, then a radius=1 is used in the GIF for this pixel. Table 1 above is one example of a possible table, and the table entries can have different values to those shown here. For some test images it has been found that the relationship between number of brightness levels/colours and radius is not inversely proportional.

Advantageously, the radius used in the GIF filter is always smaller, or equal, than the size of the window used to create the local histogram. The value of the GIF parameter (e.g. radius) can vary for each pixel in the image. The table can be created statistically by comparing the Mean Square Error (MSE) of applied filters with a different radius; the best radius (with the lowest MSE) is then selected in the table. It is possible to provide one table for each chrominance component, e.g. one table for the U component and one table for the V component. The Mean Square Error can be calculated by comparing the GIF filtered image with the original image before compression.

The example described above selects a value of the radius parameter of the GIF function 20, based on a criterion such as the number of brightness levels within a region around a pixel. For a small number of colours in a region it is possible to use a relatively large value of radius. Colour bleeding should be minimised by the edge-preserving properties of the GIF. In the case of screen content around the logo (example region 41 in the image of FIG. 3) it could be that there are different parts of red in the white part (due to down and up sampling). If this is corrected with a guided image filter and the radius is set to a low value, more of these red artifacts are taken into account while executing the GIF which will result in an average with some red colour remaining in it. However, if the radius is set to a larger value these red artifacts will be averaged out of the result. Due to the edge preserving function the extended window at the other side of the edge will not be taken into account. For a large number of colours in a region, it is advantageous to use a small value of radius. With higher amount of colors (not screen content) there are fewer edges in the screen and so the larger window will, in general, apply more smoothing to the image.

The analysis described above counts a number of brightness levels/colours appearing in the histogram. An alternative to simply counting all brightness levels/colours in the histogram is to compare the number of pixels having a brightness level with a threshold value. Only brightness levels/colours above the threshold value are counted. Another alternative to simply counting all brightness levels/colours in the histogram is to compare the difference (as a number of brightness levels) between brightness level spikes appearing in the histogram with a threshold value. Only brightness levels/colours above the threshold value are counted. This has the effect of counting groups or bands of entries in the histogram.

The table which gives a correspondence between brightness levels/colours and values of the radius parameter can be created as follows:
1. do for every frame under test
   filter the image with every radius under test [1, 3, 5, 7, 9, 11] this will result in 6 new frames.
   loop over all pixels in the frame
      create a histogram with a window of 11 pixels
      count the number of colours (brightness levels) in the histogram, there are extra variables.
         minimum: if a color (brightness level) does not have this minimum amplitude it does not count as a colour.

distance: the difference between colours (brightness values) in the histogram should be higher than this number to count this color as a different colour.
for every radius under test [1, 3, 5, 7, 9, 11]
store the sum of squared differences for this radius and color count. The sum of squared differences is calculated by comparing the filtered output (using the selected value of radius) and the original image before compression. This is repeated for each radius under test.
2. for every color count
1. lookup which radius provides the lowest sum of squared differences.
2. append this value to table of values.

The resulting table comprises a value of radius for each value of the number of brightness levels/colours. One possibility is to create the table during a learning phase using test images.

TABLE 2

| Sequence | Original | | Histogram based GIF | | Gain | |
|---|---|---|---|---|---|---|
| Office_Scada_1 | 36.67 | 38.58 | 37.32 | 40.54 | 1.77% | 5.08% |
| sc_cad_waveform | 24.97 | 23.06 | 26.76 | 25.03 | 7.17% | 8.54% |
| sc_programming | 36.14 | 35.96 | 36.83 | 36.83 | 1.91% | 2.42% |
| Video_Maps_1 | 37.95 | 42.95 | 39.05 | 43.98 | 2.90% | 2.40% |
| sc_video_conferencing_doc_sharing | 32.7 | 31.12 | 33.06 | 31.28 | 1.10% | 0.51% |
| sc_wordEditing | 37.95 | 36.28 | 37.28 | 36.48 | −1.77% | 0.55% |
| | | | | Average | 2.18% | 3.25% |

Table 2 shows test results when the histogram analysis is used to define the value of the radius parameter of the GIF, where each entry in the table is a value of peak signal-to-noise ratio (PSNR). The sequences represent test images. An objective improvement of visual quality (PSNR) on the chroma planes is achieved of between 2.18% and 3.25%.

Some alternatives/variations will now be described. The information of a local histogram could be used to obtain a GIF parameter for all pixels within the window 35 used to form the histogram. So, instead of determining a (potentially different) value of the radius parameter for each pixel, a single value of the radius parameter is determined based on a window of pixels and then that value of radius is used for the window of pixels. This can reduce the computational complexity of the image data analysis and the GIF.

The method described above can be used to determine a value of any other configuration parameter for the guided image filter for filtering the image. The value of the further parameter can be variable for different pixels of the image, or for different regions of pixels of the image.

Figure 5:
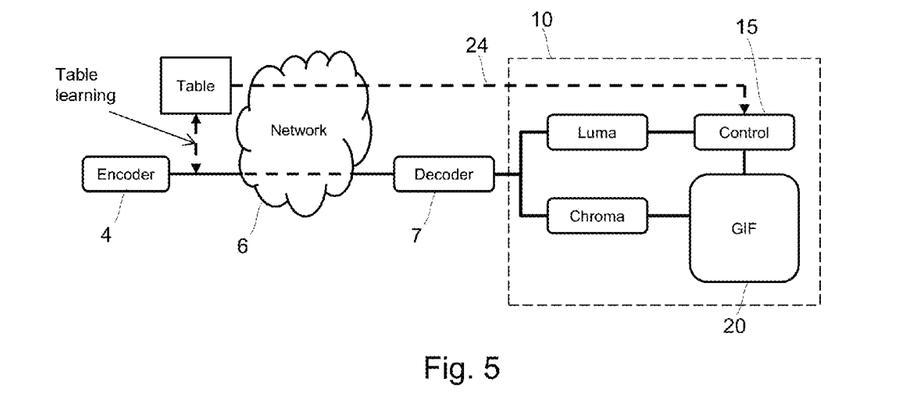
FIG. 5 shows a system in which data is sent between an encoder and the guided image filter.

FIG. 5 shows a system similar to FIG. 1, comprising an encoder 4, a decoder 7 and apparatus for colour space conversion 10. The control unit 15 receives data 24, which will be called metadata, which can be used to control a value of the radius parameter of the GIF 20. The metadata 24 can comprise a table described above, which defines a correspondence between brightness levels/colours and radius. Because the encoder 4 has already performed an analysis of the image frame for optimised encoding, this information can be reused to define the radius parameter of the GIF. One example could be that the encoder already has segmented the frame in areas of equal frequencies (MB H.264/AVC or CTB/PB/TB in H.265/HEVC), the same radius could be used for the whole of this area. To compress more efficiently the codec already analysed the frame. The encoder tries to place the borders of its block structure on the edges in the frame. It also will use smaller block sizes when there is more detail in an area. On smooth areas it will user larger blocks. This information can be used to define the radius. On larger areas it could smooth the colors without edges with high radius. When the block size is smaller the radius should be smaller to preserve the texture. Other information from the codec that could be reused can include one or more of: the Quantization Parameter (QP) value, selected de-blocking filter parameters, prediction mode.

Figure 6:
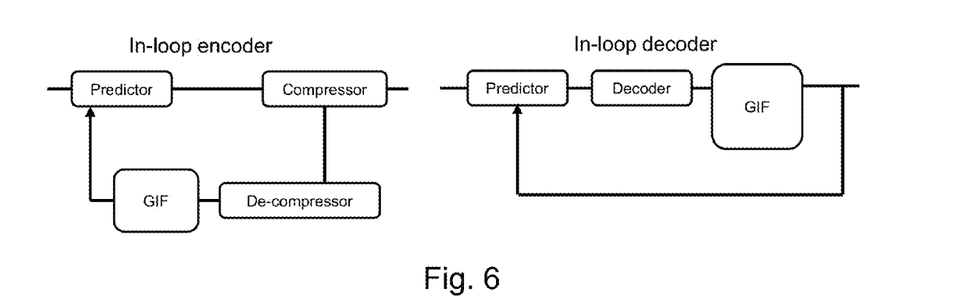
FIG. 6 shows an in-loop encoder with a guided image filter and an in-loop decoder with a guided image filter.
Figure 7:
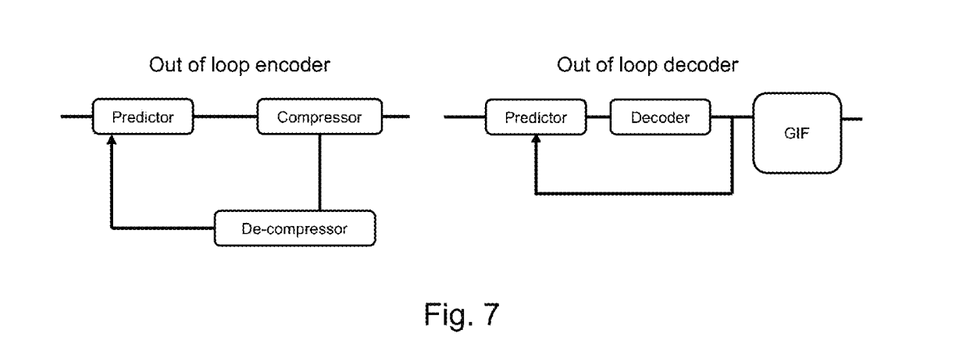
FIG. 7 shows an out-of-loop encoder and an out-of-loop decoder with a guided image filter.

FIG. 6 shows an in-loop encoder and an in-loop decoder. FIG. 7 shows an out-of-loop encoder and an out-of-loop decoder. In an in-loop encoder/decoder the GIF is positioned within the encoder/decoder.

The guided image filtering algorithm is now described in more detail. The filter can be configured with several parameters. For example, a radius parameter defines the size of the square window around the current pixel. This window is used to generate the smoothed parameter of the filter and for edge detection. The variance of this window defines if an edge is detected. With the regularization parameter the edge detection can be fine-tuned. A basic algorithm for the guided image filtering is given below.

```
Input parameters

GuideIm = guidance image
FiltIm = filtering input image
Reg = Regularization
Functions fave = average [this function uses the radius to define the window of the
GIF]
. = point wise operation
corr = correlation
var = variance
cov = covariance
I aveGuideIm = fave(GuideIm)
aveFiltIm = fave(FiltIm)
corrGuideIm = fave(GuideIm.*GuideIm)
corrGuideImFiltIm = fave(GuideIm.*FiltIm)
II varGuideIm = corrGuideIm − aveGuideIm.*aveGuideIm
covGuideImFiltIm = corrGuideImFiltIm − aveGuideIm.*aveFiltIm
III A = covGuideImFiltIm./(varGuideIm + Reg)
B = aveFiltIm − A.*aveGuideIm
IV aveA = fave(A)
aveB = fave(B)
output = aveA.* GuideIm + aveB
```

In the last step (IV) it can be seen that the output is a linear function of the guide. Due to this model the output will only have an edge if the guide has an edge. There are two parts in this linear filter: aveA*GuideIm is the edge preserving part and aveB which is the smoothing part. A is defined by making a ratio of the covariance (guide and image) and the variance (guide) (note that this is a ratio, the absolute value of variance or covariance is not relevant). This ratio indicates how the guide should be scaled to have a similar variance as the input image. aveB (via B) is compensated by removing the scaled average of the guide (this part is already added by the first part of the filter). With the regularization parameter the ratio can be adapted so the structure of the guide is not transferred with the full ratio of the difference between covariance and variance, this will less transfer the texture from the guide and more smooth the image.

Figure 8A:
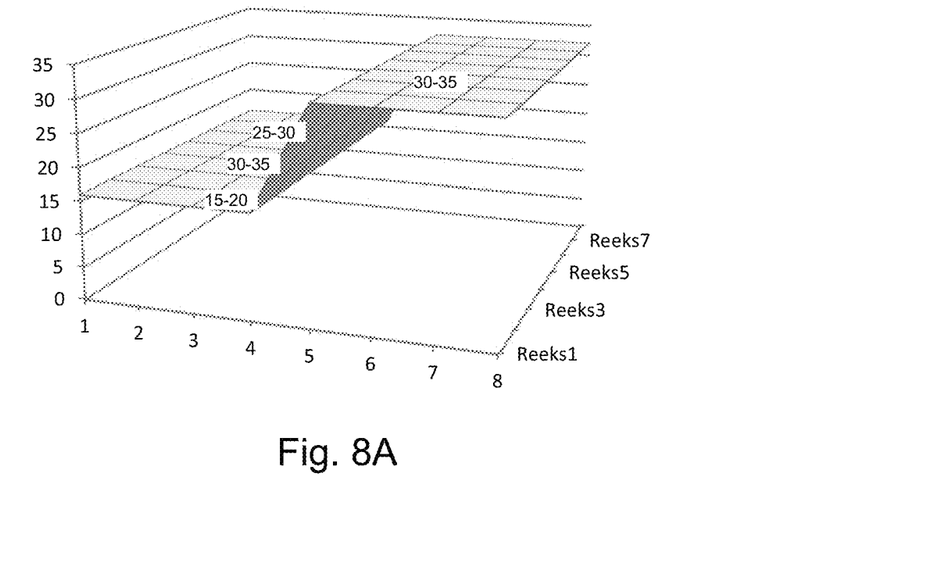
FIGS. 8A-8E show operation of the guided image filter.
Figure 8B:
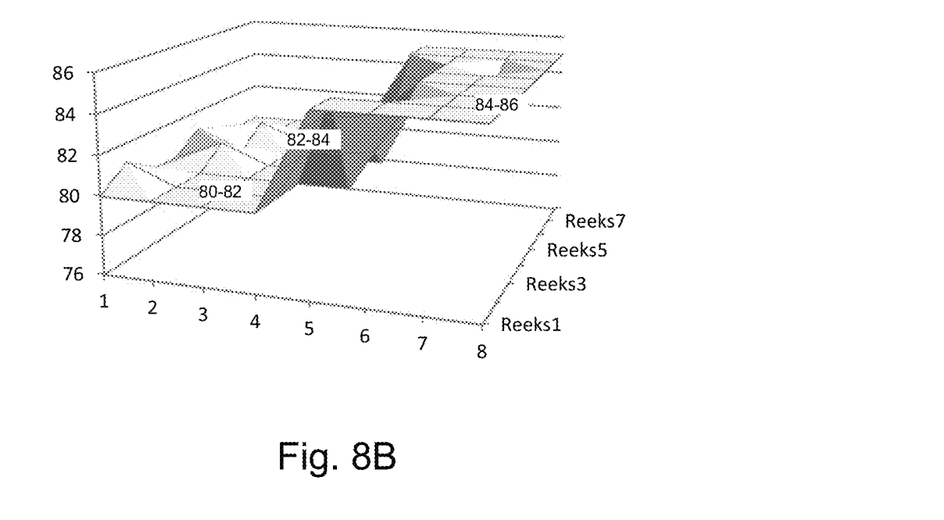
Figure 8C:
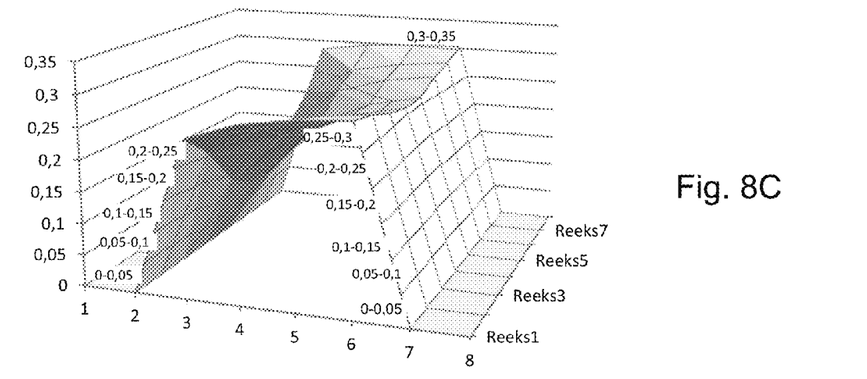
Figure 8D:
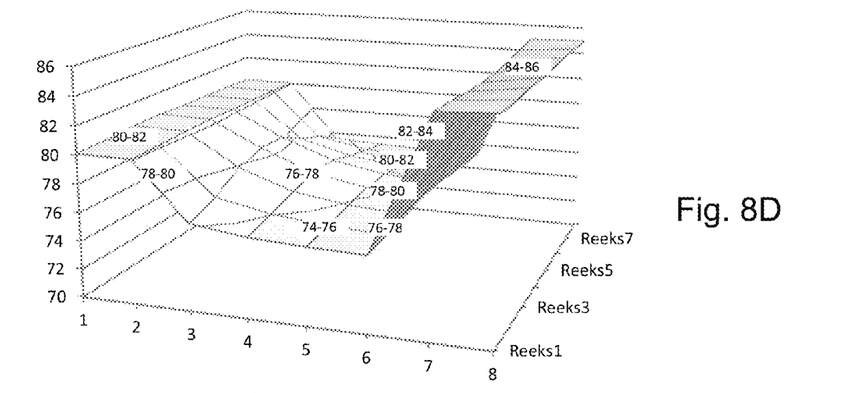
Figure 8E:
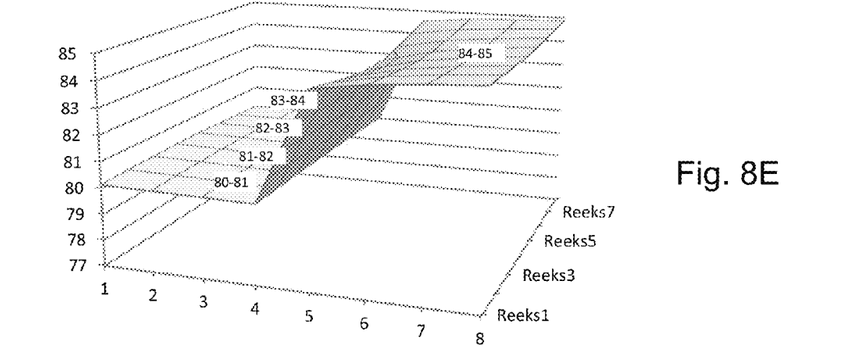

FIG. 8A shows the guide image, representing a sharp edge from value 16 to 32. FIG. 8B shows the image to be filtered. It has a sharp edge from value 80 to 85. There are also some 'artifacts' in the image above and below the edge. FIG. 8C shows the A values and FIG. 8D shows the B values. A represents the ratio that the guide should be included, B represents the smoothed filtered image (with compensating of the texture in the guide). FIG. 8E shows the final image, after taking an average of A and B. The smoothing part works well for the artifacts above and below the edge. The edge is also well reconstructed by adding the scaled guide.

Figure 9:
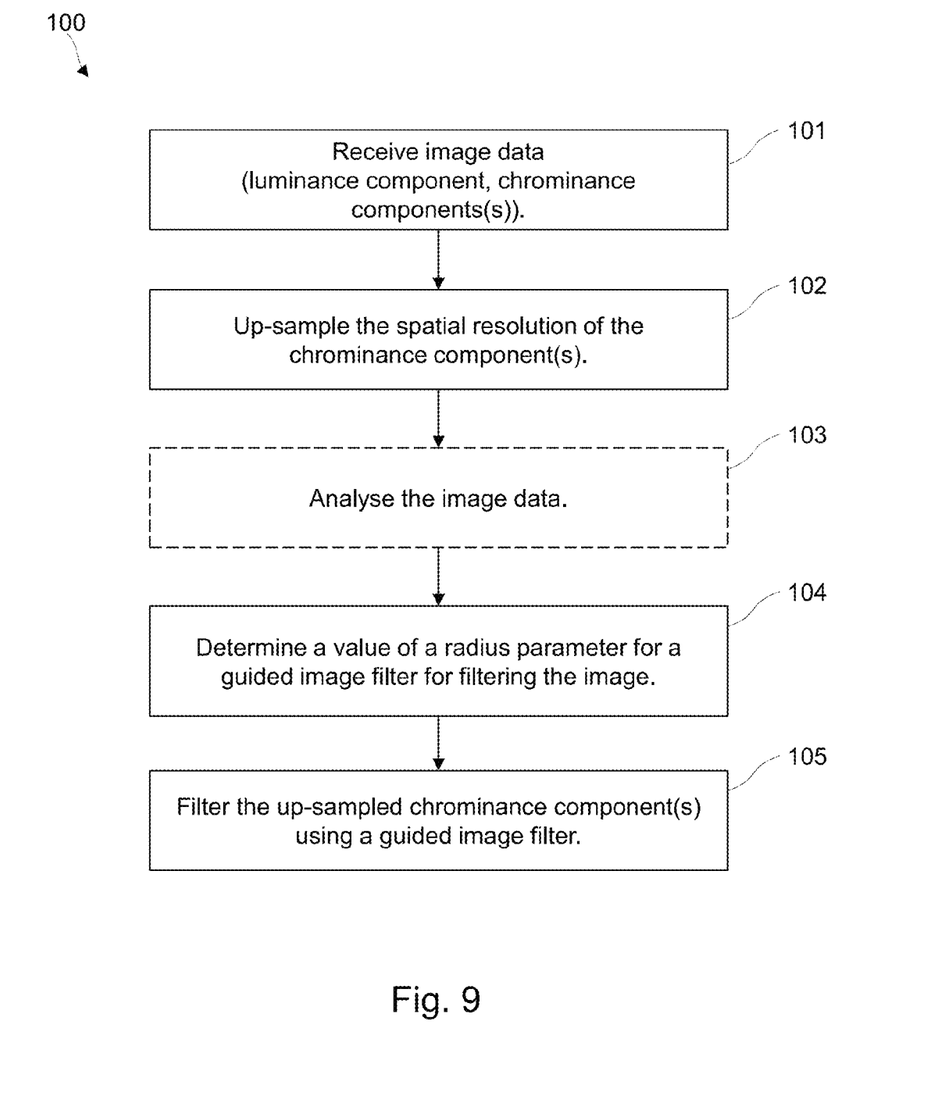
FIG. 9 shows a method performed at a decoder.

FIG. 9 shows a method of processing image data. Step 101 comprises receiving image data representing an image. The image data comprises a luminance component at a first spatial resolution and at least one chrominance component at a second, lower, spatial resolution. Step 102 comprises up-sampling the spatial resolution of the at least one chrominance component to form an up-sampled chrominance component. Step 104 comprises determining a value of a radius parameter for a guided image filter for filtering the image, wherein the value of the radius parameter is variable for different pixels of the image, or for different regions of pixels of the image. The radius parameter determining an extent of the guided image filter around each pixel. Step 105 comprises filtering the up-sampled chrominance component using the guided image filter. Optionally, the method further comprises a step 103 of analysing at least one component of the image data to determine the value of the radius parameter for each pixel of the image, or for each region of pixels of the image. The analysis can be performed in any of the ways described above.

Figure 10:
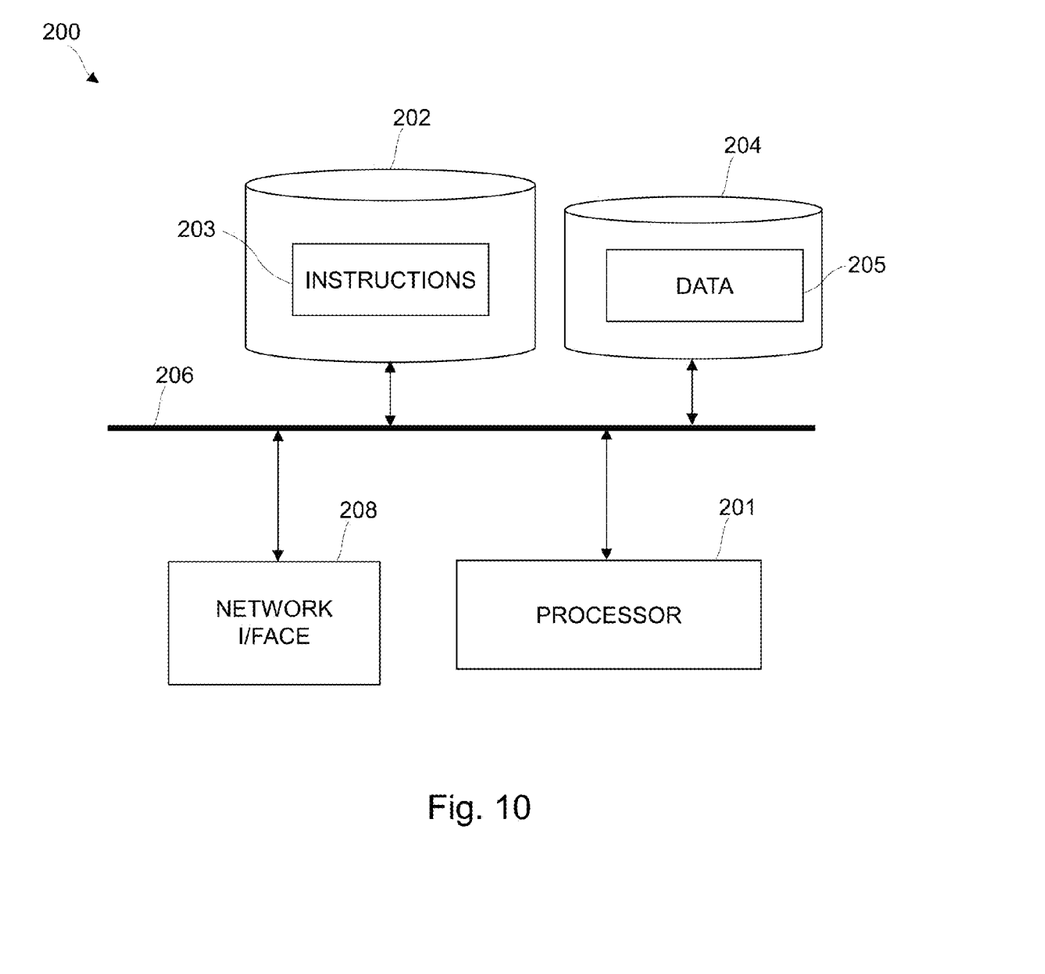
FIG. 10 shows a processing system for implementing an embodiment.

FIG. 10 shows an exemplary processing apparatus 200 which may be implemented as any form of a computing and/or electronic device, and in which embodiments of the system and methods described above may be implemented. Processing apparatus 200 may implement the system shown in FIG. 2 or the method shown in FIG. 9. Processing apparatus 200 comprises one or more processors 201 which may be microprocessors, controllers or any other suitable type of processors for executing instructions to control the operation of the device. The processor 201 is connected to other components of the device via one or more buses 206. Processor-executable instructions 203 may be provided using any computer-readable media, such as memory 202. The processor-executable instructions 203 can comprise instructions for implementing the functionality of the described methods. The memory 202 is of any suitable type such as read-only memory (ROM), random access memory (RAM), a storage device of any type such as a magnetic or optical storage device. Additional memory 204 can be provided to store data 205 used by the processor 201. The processing apparatus 200 comprises one or more network interfaces 208 for interfacing with other entities.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

This application claims priority of United Kingdom Application No. 1312533.1 filed Jul. 12, 2013, which is hereby incorporated by reference.

The invention claimed is:

1. A method for performing colour space conversion on an image to up-sample the image from a lower quality colour space to a higher quality colour space, the method comprising:
receiving image data representing the image, the image data comprising a luminance component at a first spatial resolution and at least one chrominance component at a second, lower, spatial resolution;
up-sampling the spatial resolution of the at least one chrominance component to form an up-sampled chrominance component having a higher resolution than the at least one chrominance component;
determining a value of a radius parameter for a guided image filter for filtering the image, wherein:
the value of the radius parameter is variable for different pixels of the image or for different regions of pixels of the image, and
the radius parameter determines an extent of the effect of the guided image filter around each pixel; and
filtering the up-sampled chrominance component using the guided image filter to provide a resulting up-sampled image for display.

2. A method according to claim 1 wherein the guided image filter uses the luminance component as a guide for the filtering of the up-sampled chrominance component.

3. A method according to claim 2 further comprising analysing at least one component of the image data to determine the value of the radius parameter for each pixel of the image, or for each region of pixels of the image.

4. A method according to claim 3 wherein the analysing comprises analysing the luminance component of the image data.

5. A method according to claim 4 wherein the analysing comprises analysing a window of the image data and determining a value of the radius parameter of the guided image filtering process based on the image data for the window of pixels.

6. A method according to claim 3 wherein the analysing comprises analysing a window of the image data and determining a value of the radius parameter of the guided image filtering process based on the image data for the window of pixels.

7. A method according to claim 1 further comprising analysing at least one component of the image data to determine the value of the radius parameter for each pixel of the image, or for each region of pixels of the image.

8. A method according to claim 7 wherein the analysing comprises analysing the luminance component of the image data.

9. A method according to claim 8 wherein the analysing comprises analysing a window of the image data and determining a value of the radius parameter of the guided image filtering process based on the image data for the window of pixels.

10. A method according to claim 7 wherein the analysing comprises analysing a window of the image data and determining a value of the radius parameter of the guided image filtering process based on the image data for the window of pixels.

11. A method according to claim 10 wherein the analysing comprises forming a histogram of values for the window of pixels of the image data.

12. A method according to claim 11 wherein the value of the radius is inversely proportional to a number of brightness/chrominance levels present in the image data for the window of pixels.

13. A method according to claim 10 wherein the window is a block of pixels.

14. A method according to claim 10 wherein a size of the window of pixels is variable.

15. A method according to claim 10 wherein the analysing is performed iteratively for multiple pixels of the image data, wherein each iteration of the analysis centres the window on a different pixel of the image data.

16. A method according to claim 1 further comprising receiving data from an encoder which was used to encode the image data, and determining the value of the radius parameter for each pixel of the image, or for each region of pixels of the image, based on the received data.

17. A method according to claim 1 further comprising determining a value of a further parameter for the guided image filter for filtering the image, wherein the value of the further parameter is variable for different pixels of the image, or for different regions of pixels of the image.

18. A method according to claim 1 which is performed as part of an image encoder, wherein the step of determining a value of a radius parameter for a guided image filter is used to determine data for sending to an image decoder.

19. A computer program product comprising a non-transitory machine-readable medium carrying instructions which, when executed by a processor, cause the processor to perform the method of claim 1.

20. Apparatus for performing colour space conversion on an image to up-sample the image from a lower quality colour space to a higher quality colour space, the apparatus comprising:
an input arranged to receive image data representing the image, the image data comprising a luminance component at a first spatial resolution and at least one chrominance component at a second, lower, spatial resolution;
an up-sampling unit arranged to up-sample the spatial resolution of the at least one chrominance component to form an up-sampled chrominance component having a higher resolution than the at least one chrominance component;
a guided image filter arranged to filter the up-sampled chrominance component and provide a resulting up-sampled image for display, wherein the guided image filter comprises a radius parameter which determines an extent of the effect of the filter around a pixel; and
a control unit for the guided image filter arranged to determine a value of the radius parameter of the guided image filter, wherein the value of the radius parameter is variable for different pixels of the image or for different regions of pixels of the image.

21. Apparatus according to claim 20 further comprising an analysing unit arranged to analyse at least one component of the image data to determine the value of the radius parameter for each pixel of the image, or for each region of pixels of the image.

* * * * *